Patented May 26, 1925.

1,539,714

UNITED STATES PATENT OFFICE.

NIELS C. CHRISTENSEN, OF SALT LAKE CITY, UTAH.

PROCESS OF TREATING SULPHIDE ORES OF LEAD, SILVER, AND COPPER.

No Drawing.   Application filed April 9, 1920.   Serial No. 372,691.

*To all whom it may concern:*

Be it known that I, NIELS C. CHRISTENSEN, a citizen of the United States, residing at Salt Lake City, in the county of Salt Lake and State of Utah, have invented certain new and useful Processes of Treating Sulphide Ores of Lead, Silver, and Copper, of which the following is a specification.

This invention relates to the treatment of the sulphide ores of silver, lead and copper by a process of lixiviation. The process treats ores or concentrates containing galena, argentite and chalcocite by lixiviation without any preliminary treatment, i. e., treats the natural sulphides without any preliminary oxidizing, sulphating or chloridizing roast.

My process consists in treating the finely ground ore with a hot concentrated solution of one or more of the common chlorides containing a small amount of acid. Either hydrochloric or sulphuric acid may be used though the former is preferable.

I have found that a hot solution of any of the common chlorides such as NaCl, $CaCl_2$, $MgCl_2$ or $FeCl_2$, containing a small amount of acid rapidly dissolves galena, argentite and chalcocite. Acid solutions of KCl, $MH_4Cl$ and $MnCl_2$, also act in the same way but would rarely be used. Zinc chloride solution acts similarly but is much less active, owing to the more limited solubility of the silver, lead and copper chlorides in the solution. Ferric chloride alone is the least suitable among the chlorides owing to the very slight solubility of the silver and lead chlorides in this solution. The solutions which would be used in most cases in my process are those containing NaCl, or a mixture of NaCl and some of the following: $CaCl_2$, $MgCl_2$, or $FeCl_2$. In some places where cheap $CaCl_2$ is obtainable it might be used in preference to NaCl.

The action of the acid chloride solution on the galena argentite and chalcocite is indicated in the following equations:

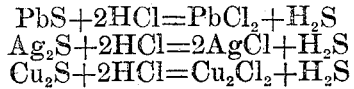

The lead, silver and copper are dissolved as chlorides in the hot chloride solution and the sulphur is driven off as $H_2S$. The action upon the galena is very rapid and is somewhat slower on the chalcocite and still slower on the argentite. The silver contained in the galena is brought into solution as rapidly as the galena. The time of treatment necessary to bring the metals into solution will vary with the fineness of grinding, the temperature of the solution, the concentration of the acid in the solutions and the concentration of the lead, copper and silver chlorides in the solution. Fine grinding approaching 100 mesh or finer is preferable in most cases. The solutions act most vigorously near the boiling point of the solution, and hot solutions are preferable in all cases. An excess of acid above the amount theoretically necessary to bring the metals into solution is necessary but a concentrated acid solution is not necessary and is not advantageous in the practical operation of the process. As the concentration of the solution in lead, silver and copper increases the rapidity of the action, decreases and becomes extremely slow as the solution nears saturation, so that it is not advantageous to attempt to use solutions too near saturation in regard to the lead, silver and copper. A treatment of from 15 to 30 minutes with a hot solution containing a small percentage of excess acid is sufficient to bring the lead, silver and copper into solution. The $H_2S$ given off during treatment may be collected and utilized for making sulphur or for other purposes. The treatment in the practical operation of the process is preferably carried out by agitating the finely ground ore or concentrate with the hot acid chloride solution until the lead, silver and copper are in solution and then decanting or filtering the hot pregnant solution away from the ore.

The method of precipitation of the metals from the pregnant solution will vary with the quantity and number of metals in the ore and in the products desired. If the ore contains only galena, the solution may be cooled and the lead chloride separated as described in my patent applications Serial No. 327,400 and Serial No. 327,401 or the lead may be precipitated by electrolysis as described in these applications. If the solution contains silver this is preferably precipitated with metallic lead before the precipitation of the lead or lead chloride. If the solution contains copper as well as silver and lead, the silver is preferably first precipitated with metallic copper, the copper then precipitated with metallic lead and the lead finally precipitated by one of the methods mentioned. The silver or copper may also be precipitated with metallic iron as may also the lead, but the iron acts slowly upon the lead chloride in the concentrated chloride solutions, and the other methods for the precipitation of the lead are preferable. As before mentioned the exact method of precipitation will depend upon the contents of the ore and the products desired.

The acid chloride solution does not act upon pyrite or chalcopyrite, or upon some of the complex arsenical silver minerals, but does act upon zinc blende to a limited extent. It is practically impossible however to secure a complete extraction of the zinc unless a very large volume of solution containing a considerable excess of acid is used. The process is therefore not well adapted to the treatment of zinc sulphide ores for the recovery of the zinc but is suitable for the recovery of the lead from these ores, as the solution acts more rapidly on the galena than on the blende.

As before mentioned any of the common chlorides except zinc chloride and ferric chloride may be used in the process, but those ordinarily used will be NaCl or CaCl₂ or a mixture of NaCl with other chlorides.

As it is obviously impossible to describe all the variations in the details of the application of my process to all kinds of ores, I do not wish to be limited by the foregoing brief description but by the appended claims.

By my process I have secured practically complete extractions of the lead and silver from galena ores and concentrates, and have secured practically complete extractions of the lead and silver and copper from the galena and chalcocite in ores containing these minerals together with pyrite and chalcopyrite, and have left the pyrite and chalcopyrite in excellent condition for recovery by flotation. The silver and copper locked up in the pyrite and chalcopyrite are recovered with these minerals.

By my process I have also made practically complete extractions of the copper in the form of chalcocite in copper concentrates and extractions of from 95–98% of the silver in ores containing the silver as a sulphide.

From the foregoing it will be apparent that my process has a great many advantages over the old methods in which the ore is subjected to an oxidizing, sulphating or chloridizing roast, and thereafter lixiviated for the recovery of the metals, both in the cost, simplicity of treatment and completeness of extraction.

Having described my process, what I claim and desire to patent is:

1. The process of treating sulphide ores and the like for the recovery of metals therefrom which consists in mixing said ores and the like with a hot concentrated chloride brine containing acid and thereby decomposing the simple sulphide minerals of lead, silver and copper which are contained in said ores and the like and dissolving the metals of said minerals in said solution, and separating said solution from the treated ore and precipitating dissolved metal therefrom with metallic lead and thereafter precipitating lead from said solution by electrolysis.

2. The process of treating sulphide ores and the like for the recovery of metals therefrom which consists in mixing said ores and the like with a hot concentrated chloride brine containing acid and thereby decomposing the simple sulphide minerals of lead, silver and copper which are contained in said ores and the like and dissolving the metals of said minerals in said solution, and separating said solution from the treated ore and precipitating dissolved metal therefrom with metallic lead and thereafter precipitating lead from said solution by electrolysis with an iron anode.

3. The process of treating sulphide ores and the like for the recovery of metals therefrom which consists in mixing said ores and the like with a hot concentrated chloride brine containing acid and thereby decomposing the simple sulphide minerals of lead, silver and copper which are contained in said ores and the like and dissolving the metals of said minerals in said solution and separating said solution from the treated ore and precipitating silver therefrom with metallic copper.

4. The process of treating sulphide ores and the like for the recovery of metals therefrom which consists in mixing said ores and the like with a hot concentrated chloride brine containing acid and thereby decomposing the simple sulphide minerals of lead, silver and copper which are contained in said ores and the like and dissolving the metals of said minerals in said solution and separating said solution from the treated ore and precipitating copper therefrom with metallic lead.

5. The process of treating sulphide ores and the like for the recovery of metals therefrom which consists in mixing said ores and the like with a hot concentrated chloride brine containing acid and thereby decomposing the simple sulphide minerals of lead, silver and copper which are contained in said ores and the like and dissolving the metals of said minerals in said solution and separating said solution from the treated ore and precipitating copper therefrom with metallic lead, and thereafter precipitating lead therefrom by electrolysis.

6. The process of treating sulphide ores and the like for the recovery of metals therefrom which consists in mixing said ores and the like with a hot concentrated chloride brine containing acid and thereby decomposing the simple sulphide minerals of lead, silver and copper which are contained in said ores and the like and dissolving the metals of said minerals in said solution and separating said solution from the treated ore and precipitating copper therefrom with metallic lead, and thereafter precipitating lead therefrom by electrolysis with an iron anode.

7. The process of treating sulphide ores and the like for the recovery of metals therefrom which consists in mixing said ores and the like with a hot concentrated chloride brine containing acid and thereby decomposing the simple sulphide minerals of lead, silver and copper which are contained in said ores and the like and dissolving the metals of said minerals in said solution and separating said solution from the treated ore and precipitating silver therefrom with metallic copper, and thereafter precipitating metallic copper therefrom with metallic lead and thereafter precipitating lead therefrom by electrolysis.

8. The process of treating sulphide ores and the like for the recovery of metals therefrom which consists in mixing said ores and the like with a hot concentrated chloride brine containing acid and thereby decomposing the simple sulphide minerals of lead, silver and copper which are contained in said ores and the like and dissolving the metals of said minerals in said solution and separating said solution from the treated ore and precipitating silver therefrom with metallic copper, and thereafter precipitating metallic copper therefrom with metallic lead, and thereafter precipitating lead therefrom by electrolysis with an iron anode.

In testimony whereof I have signed my name to this specification.

NIELS C. CHRISTENSEN.